(12) United States Patent
Hsu et al.

(10) Patent No.: US 9,234,622 B2
(45) Date of Patent: Jan. 12, 2016

(54) MULTIPURPOSE SUPPORT DEVICE AND METHOD

(76) Inventors: Shih-Hsiang Hsu, Hualien (TW); Eric C. Luo, Plano, TX (US)

( * ) Notice: Subject to any disclaimer, the term of this patent is extended or adjusted under 35 U.S.C. 154(b) by 247 days.

(21) Appl. No.: 12/866,711

(22) PCT Filed: Jan. 22, 2009

(86) PCT No.: PCT/US2009/000483
§ 371 (c)(1),
(2), (4) Date: Nov. 1, 2010

(87) PCT Pub. No.: WO2009/102396
PCT Pub. Date: Aug. 20, 2009

(65) Prior Publication Data
US 2011/0057088 A1    Mar. 10, 2011

Related U.S. Application Data

(60) Provisional application No. 61/027,795, filed on Feb. 11, 2008.

(51) Int. Cl.
| | | |
|---|---|---|
| A47B 97/04 | (2006.01) | |
| F16M 13/00 | (2006.01) | |
| A47B 23/02 | (2006.01) | |
| A47B 23/04 | (2006.01) | |
| F16M 11/10 | (2006.01) | |
| F16M 11/12 | (2006.01) | |
| F16M 11/20 | (2006.01) | |
| F16M 11/24 | (2006.01) | |
| F16M 11/42 | (2006.01) | |

(52) U.S. Cl.
CPC ............. *F16M 13/00* (2013.01); *A47B 23/02* (2013.01); *A47B 23/042* (2013.01); *F16M 11/10* (2013.01); *F16M 11/12* (2013.01); *F16M 11/2014* (2013.01); *F16M 11/24* (2013.01); *F16M 11/42* (2013.01)

(58) Field of Classification Search
USPC ....................................... 248/451, 118, 346.5
See application file for complete search history.

(56) References Cited

U.S. PATENT DOCUMENTS

| | | | | |
|---|---|---|---|---|
| 4,913,390 A | * | 4/1990 | Berke | 248/176.3 |
| 5,072,905 A | * | 12/1991 | Hyatt | 248/118 |
| 5,158,256 A | * | 10/1992 | Gross | 248/118.3 |
| 5,393,029 A | | 2/1995 | Senko | |
| 5,769,369 A | * | 6/1998 | Meinel | 248/176.1 |
| 6,595,474 B2 | * | 7/2003 | Nicholson | 248/118 |
| 6,796,536 B1 | * | 9/2004 | Sevier, IV | 248/121 |
| 7,007,902 B1 | * | 3/2006 | Root | 248/118.3 |
| 7,063,296 B2 | * | 6/2006 | Williams | 248/285.1 |
| 7,178,469 B2 | * | 2/2007 | Goza | 108/50.01 |
| 2004/0007649 A1 | | 1/2004 | Vettraino | |
| 2004/0144900 A1 | | 7/2004 | Sheppard | |
| 2005/0218272 A1 | | 10/2005 | Ritchey et al. | |
| 2008/0029663 A1 | | 2/2008 | Derry et al. | |

OTHER PUBLICATIONS

International Search Report issued by US/ISA, Lee W. Young (authorized officer); dated Mar. 23, 2009.

* cited by examiner

*Primary Examiner* — Joanne Silbermann
(74) *Attorney, Agent, or Firm* — Winstead PC

(57) ABSTRACT

The invention is directed multipurpose support device for supporting an item such as a laptop computer or a book. The support device has a base that is adapted to be coupled to a structural support, such as a mobile cart, a desk, a sofa or a wall.

7 Claims, 4 Drawing Sheets

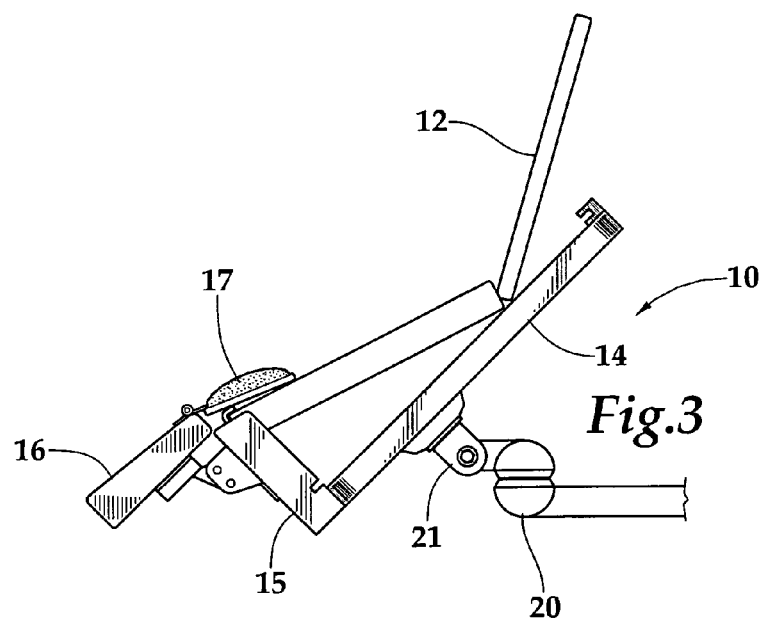
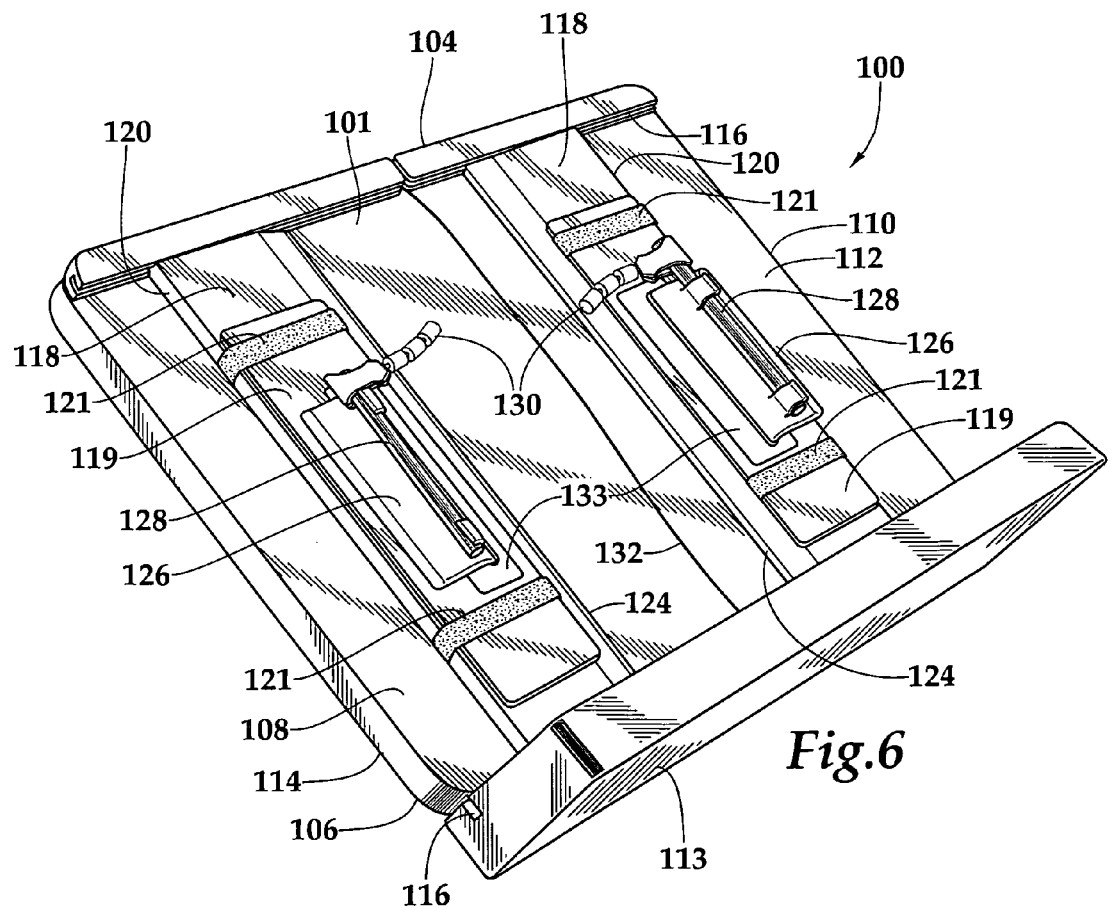

MULTIPURPOSE SUPPORT DEVICE AND METHOD

CROSS REFERENCES TO RELATED APPLICATIONS

This application claims the benefit of U.S. Provisional Application 61/027,795, filed Feb. 11, 2008.

FIELD OF THE INVENTION

The present invention relates to a multipurpose support device for supporting an item such as a laptop computer or a book. The multipurpose support device of the present invention is used while attached to a structural support, such as a mobile cart, a desk, a sofa or a wall.

BACKGROUND OF THE INVENTION

Many people spend a lot of time using a laptop computer. Most people use a laptop computer by leaving it on the top of a desk and read information on a laptop computer screen with their neck straight or bent downward depending on the position of the computer screen. This posture causes a lot of stress and strain on the user's neck. In addition, people tend to lean forward and keep their back away from the back of the chair. This posture causes a lot of stress and strain on the back and shoulder. People place their forearms, hands and wrists on top of the desk when they type on the keyboard of the laptop or use the mouse panel of the laptop. This type of posture causes a lot of stress on all joints of upper extremities. Working with a laptop computer for several hours a day with this unhealthy posture could make a person feel tired easily with pain at their neck, shoulder, back and wrists. This could lead to an injury of the spine, back, shoulder, neck, and wrists.

To avoid the aforementioned kind of pain or injury, a person should use a laptop computer in a relaxed posture with the least amount of stress and strain to the neck, back, shoulder and wrists. The most relaxed posture for using a laptop computer is sitting on a chair at a reclined angle. The laptop computer is placed in a proper holder with comfortable forearm and wrist supports, so that the user can see the laptop computer screen easily while sitting at a reclined angle with the neck and back rested on the chair back and user's elbows, wrists and hands rested on proper supports. This relaxed posture causes the least amount of stress to the spine, neck, shoulder, hands and wrists.

Similarly, it is important to adopt a proper posture when reading a book. Users often position a book on their laps or on top of a desk and bend over the book in order to read it. Oftentimes, a user will hold the spine of the book with one hand, while turning the pages with the other. In addition to creating fatigue and stress for the neck and shoulders, reading a book can also cause fatigue of the hands and fingers because of the need to grip the book and turn the pages.

Devices that are currently available in the marketplace provide a support for a laptop computer or book, but however do not allow the device to be adjusted in order to promote good posture of the user. In other words, the presently available commercial devices do not address the bad posture problems of users of laptop computers and readers of books. Hence, it is desirable to have a support device that is capable of holding a laptop computer or a book, while also promoting good posture.

SUMMARY OF THE INVENTION

An embodiment of the invention is directed to a multipurpose support device comprising: a base comprising a substantially horizontal surface; and a first support member that is coupled to the base, wherein the plane of the first support member is substantially perpendicular to the base, and wherein the base is movably connected to a structure, said structure providing a means for holding the multipurpose support device in a specified position. In an additional embodiment of the invention, a second support member is connected to the first support member wherein the second support member is movable relative to the base and the first support member, and the second support member comprises a plurality of wrist supports. In certain embodiments of the invention, the second support member is immovable relative to the base and the first support member.

An embodiment of the invention is directed to a method for using a multipurpose support device having a base comprising a substantially horizontal surface; a first support member coupled to the base, and a second support member that is connected to the first support member, and wherein the second support member comprises a plurality of wrist supports; the method comprising the following steps: positioning the bottom edge of a laptop computer on the first support member; positioning the top edge of the lap top on the base; resting the user's forearms on the forearm supports of the second support member; extending the wrist supports of the second support member towards the surface of the laptop computer; and resting the user's wrists on the wrist supports of the second support member.

An additional embodiment of the invention is directed to a method for using a multipurpose support device having a base comprising a substantially horizontal surface; a first support member coupled to the base, wherein the plane of the first support member is substantially perpendicular to the base, and wherein the base is movably connected to a structure, said structure providing a means for holding the multipurpose support device in a specified position, and further comprising securing members at the lateral outer edge of the base to which are attached flexible extender members; the method comprising the following steps: positioning an open book on the base; securing each lateral side of the book with the securing members; and positioning one or more selected pages of the book under the flexible extenders.

BRIEF DESCRIPTION OF THE DRAWINGS

FIG. 3 is a diagrammatic side view illustrating an embodiment of the multipurpose support device of the invention.

FIG. 6 is a diagrammatic perspective view illustrating an embodiment of the multipurpose support device of the invention.

DETAILED DESCRIPTION OF EXEMPLARY EMBODIMENTS

Figure 1:
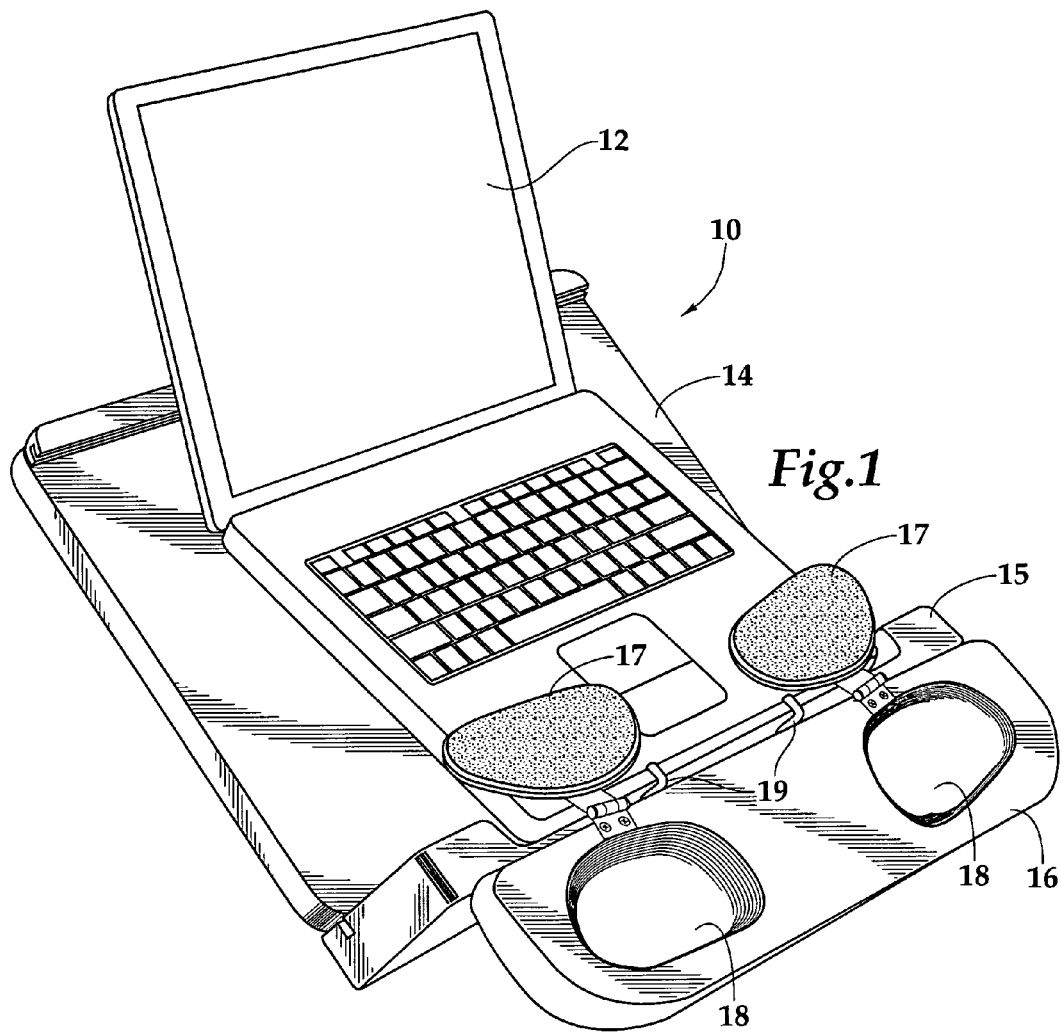
FIG. 1 is a diagrammatic perspective view illustrating an embodiment of the multipurpose support device of the invention.

As seen in FIG. 1, a multipurpose support device 10 is shown holding a laptop computer 12. The support device 10 comprises a member or base 14 that serves as the platform upon which a portion of the laptop computer 12 rests. The support device 10 further comprises a first support member 15 that is substantially perpendicular to base 14 and immovably connected to base 14. The first support member 15 provides a surface upon which the bottom portion of the laptop computer may be placed. The multipurpose support device 10 further comprises a second support member 16 that is movably connected to member 15. In order to prevent the bottom portion of the laptop computer from sliding off the surface of member 15, a plurality of restraints 19 such as hooks may be employed. The location of the restraints may be changed to allow for better support of a laptop computer by allowing rearrangement of the restraints 19 on member 15. Member 16 comprises a plurality of wrist supports 17 that may be extended by a user and placed on top of the laptop computer 12, when the multipurpose support device 10 is in use. The position of member 16 may be adjusted so that the angle of member 16 relative to member 15 can be changed either along a vertical plane or a horizontal plane in accordance with a user's comfort. When the multipurpose support device is not in use, the wrist supports 17 may be placed within recessed spaces 18 located on member 16. Additionally, the second support member 16 provides a user with a surface to rest their forearms. Member 16 may optionally comprise a strip of padded material (not shown) to promote comfort of the forearms when they are resting on member 16. In certain embodiments of the invention, the second support member 16 may be immovably connected to member 15.

Figure 2:
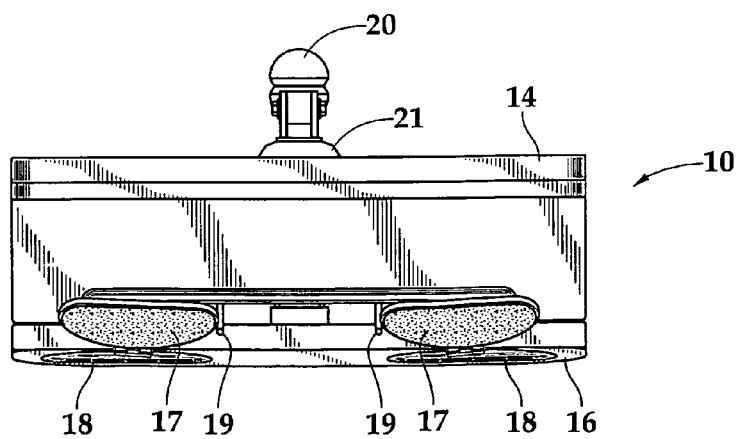
FIG. 2 is a diagrammatic top view illustrating an embodiment of the multipurpose support device of the invention.

As seen in FIG. 2, the location and position of a first arm member 21 that is attached to the posterior surface, i.e., opposite surface to where the laptop computer would rest, of the base 14 is shown. The first arm member 21 functions to position the multipurpose support device 10 at an angle that is comfortably suitable for the user and which allows the user to maintain the proper posture when using the multipurpose support device. The first arm member 21 is movably connected to a second arm member 20, which in turn may be connected to additional arm members, a surface such as a desk, a cart or a vertical member (not shown) to facilitate the fixed anchoring of the multipurpose support device 10.

FIG. 3 shows a side elevation view of the multipurpose support device 10 with first arm member 21 connected to base 14 and second arm member 20 connected to first arm member 21.

Figure 4:
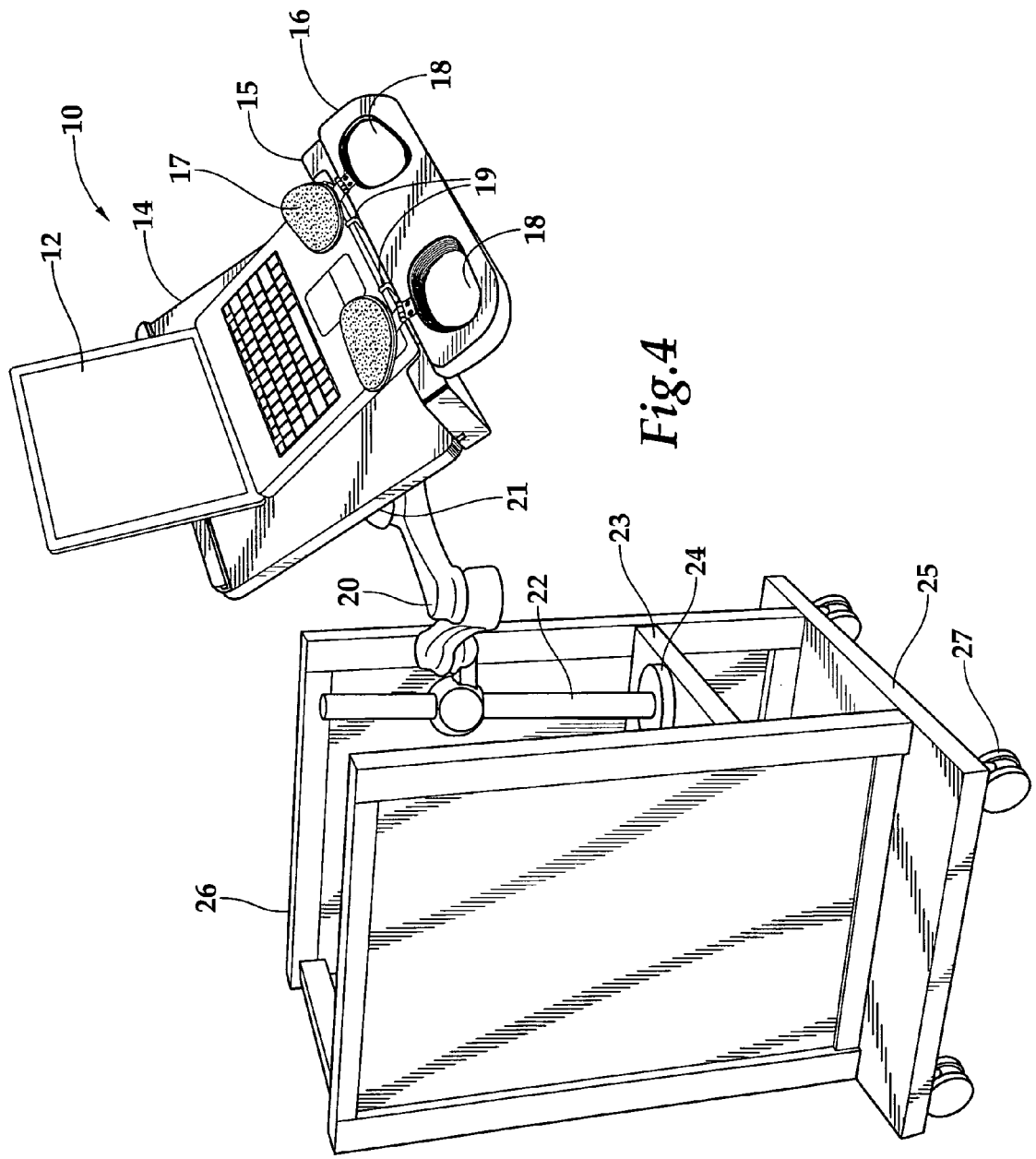
FIG. 4 is a diagrammatic perspective view illustrating an embodiment of the multipurpose support device of the invention.

FIG. 4 is a perspective view of the multipurpose support device 10 comprising a first arm member 21 and a second arm member 20, wherein the second arm member is connected to a vertical member 22. The vertical member is contained within a housing 26 which comprises a shelf-like member 23 to which the vertical member 22 is connected by its base 24. The bottom end of the housing comprises a floor 25, to which are connected a plurality of wheels 27. The wheels 27 allow a user to transport the multipurpose support device 10 and housing 26 to a convenient location. In the event that wheels 27 are employed, it is desirable to provide a mechanism to fix or lock the wheels (not shown) when the multipurpose support device 10 is conveniently positioned for use.

The presence of the first arm member 21 and second arm member 20 permits the user to adjust the position of the multipurpose support apparatus 10, so that the user may comfortably position a laptop computer at a convenient distance and position in a manner while maintaining good posture. The profile of vertical member 22 may have a straight shape (as shown in FIG. 4) or a curved shape (not shown).

The multipurpose support device 10 is positioned relative to the user in a seated position so that the keyboard is approximately at the same plane as the user's forearms when typing.

Additionally, the user's wrists are at the level of the wrist supports 17. At the same time, the user's posture is that of a relaxed, reclining nature. In addition to the wrist supports 17, an additional forearm support, such as a padded support (not shown) may be included with member 16, so that the user's forearms may comfortably rest on the surface of member 16, while the user's wrists are supported by the wrist supports 17.

It will be seen from the following description, that the multipurpose support device 10, particularly base 14 may be horizontally adjustable toward and away from the user, i.e., translationally. Moreover, the multipurpose support device is simultaneously pivotal along a horizontal axis parallel to base 14. One embodiment of the multipurpose support device 10 for providing both translational and pivotal or rotational movement of the base 14 may comprise a first arm member 21 fixedly attached to the bottom surface of base 14 and having a plurality of sliding dovetail members (not shown). As will be appreciated by those persons of ordinary skill in the art, sliding dovetails are only exemplary of mechanical arrangements that permit base 14 to be movable relative to the housing 26 and the vertical member 22.

From the above description it will be apparent that the multipurpose support device, on which the laptop computer 12 rests, may be moved relative to the user both pivotally and translationally, as well as vertically, thus accommodating users of different height, girth, and personal preference for the position of the laptop computer during keyboarding or using mouse panel as well as for maintaining the display at an appropriate height and angle for viewing.

It may be desirable when using a laptop computer 12 with the present invention to connect the computer to a source of AC power through an in-line transformer (not shown) and/or connect it to a printer (not shown). To accommodate the cords to the printer and/or power it may be desirable to hold the cords in a convenient position. For example, a channel or trough (not shown) could be formed in one surface of a solid stanchion or if the stanchion is hollow, such as a pipe, suitable holes could be provided through which the ends of the cord could enter and exit near the member 14 and the floor 25 of the housing 26. Alternatively, a simple clamp or Velcro belt could be used to hold the cords in place (not shown).

In certain embodiments of the invention, one or more sliding plates (not shown) may be added to the back of the base 14, which can be slid out to enable the user to place books or sheets of paper on the sliding plates when using the multipurpose support device 10.

Figure 5:
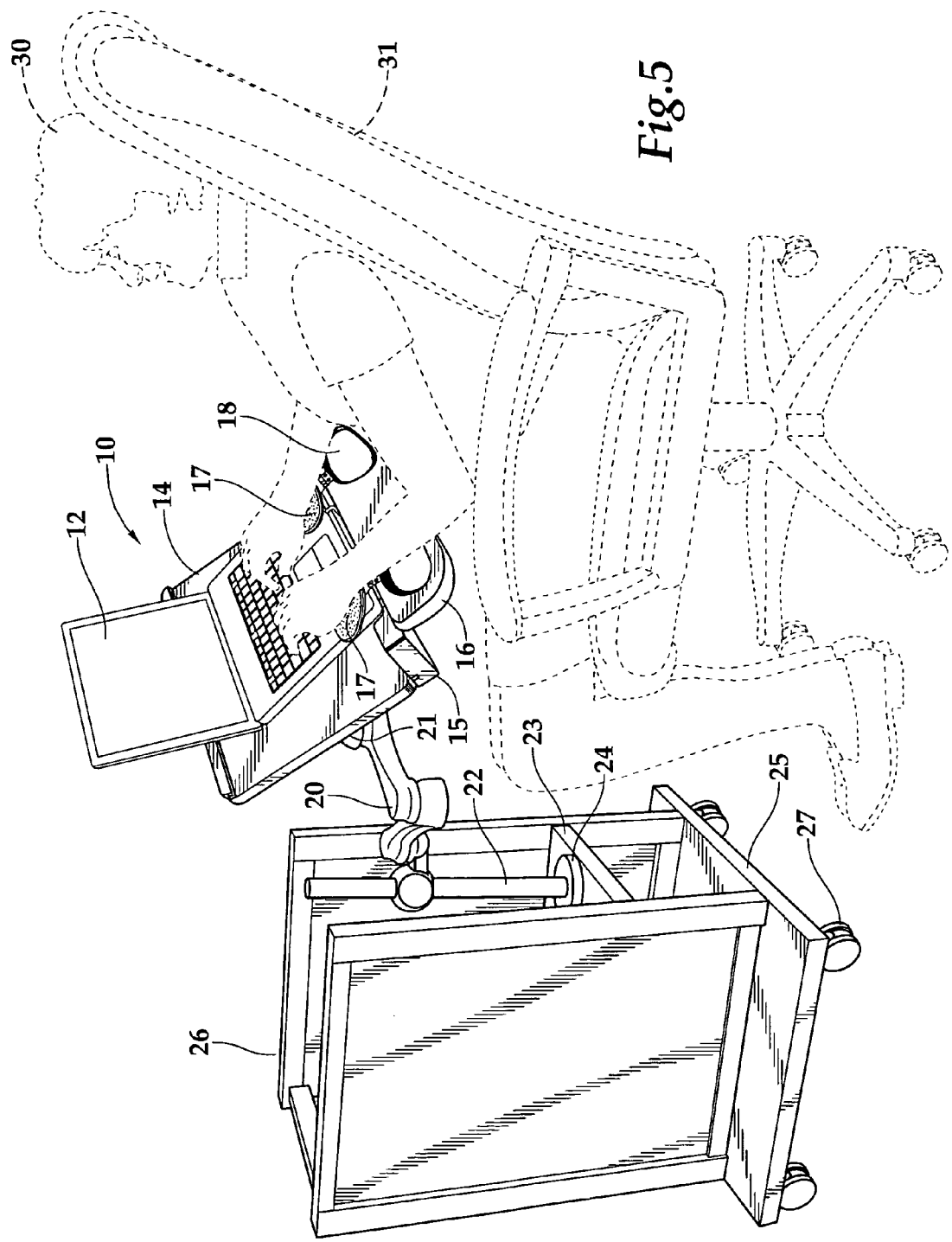
FIG. 5 is a diagrammatic perspective view illustrating an embodiment of the multipurpose support device of the invention.

As shown in FIG. 5, a user 30 can place the laptop on the anterior surface of base 14, sit on a chair with a slightly reclined angle 31, rest the back and neck on the chair, pull and adjust the multipurpose support device 10 to a comfortable position and angle to rest the elbows on the chair arms and rest the forearms on member 16 and rest the wrists on the wrist supports 17. With this posture, the user's neck, back, elbows, forearms, and wrist are fully supported and rested on various supports, thus reducing the chance of pain and injury to the users.

In certain embodiments of the invention, a plurality of adjustable sliding plates of suitable dimensions (not shown) can be added to the anterior surface of the base 14 to raise the bottom portion of the laptop computer away from base 14 in order to make room for a power cord or other wires to be plugged into the back end of the laptop computer.

In an embodiment of the invention, two side clamps are added to the surface of the base 14 to enable the user to use the multipurpose support device for reading a book or magazine. In FIG. 6, the base 101 is analogous to the base 14 depicted in FIGS. 2-5.

As best illustrated in FIG. 6, the book holder embodiment of the multipurpose support device of the invention 100 comprises a base 101 having an upper edge member 104, a lower edge 106, a first side edge 108, a second side edge 110, a front side 112 and a back side 114. Attached to the lower edge 106, is a first support member 113 that is fixedly connected to the lower edge 106 and is substantially perpendicular to the base 101. The upper edge member 104 and the first support member 113 each have a slot 116 present therein. Each of the slots 116 generally extends along the length of the upper edge member 104 and member 113. Each of a pair of vertical plates 118 is removably extended into the slots 116. Each of the plates 118 has an outer edge 120 biased outwardly away from the center of the base 101. The plates 118 also each have an inner edge 124 biased towards the center of the base 101. The inner edges 124 of the plates 118 face one another. To each of the plates 118, a movable plate 119 is attached via connectors 121. The plates 119 are capable of being moved along a vertical plane along the plates 118.

Each of a pair of securing members 126 is attached to the outer edges 120 of the plates 118. The securing members 126 are adapted for attaching a book to the plates 118. Each of the securing members 126 preferably comprises a clip 133 biased towards the inner edge 124 of the plates 118. The clip 133 is used to clamp down the lateral edge of the book pages on to the base 101. In certain embodiments of the invention, the clip 133 may be transparent, which allows the user to be able to see and read the content on the portion of the page that is clamped under the clip 133.

In use, the plates 118 are extended outwardly from the base 101 so that the base 101 is of a size required for a book to be fixed on the base 101. The securing members 126 are used to attach a book or other reading material to the plates 118 so that the book is placed in an open position. Each of the securing members comprises a vertical rod 128 to which is attached a flexible finger-like extender 130. The flexible extenders 130 may be used to maintain the pages of the book in place during use. Each of the plates 119 can be moved along a vertical plane, i.e., up and down in order to accommodate tall or short books.

The securing member 126 on one side of the device may be used to secure the pages that have already been read. The securing member 126 on the opposite side of the panel may be used to secure those pages that are not anticipated to be read during a particular session. The collection of pages to be read in a particular session may be positioned between the securing member 126 and the flexible extender 130. Adjustments of amounts of pages positioned under the securing members 126 and the amounts of pages comprising reading-session pages positioned under the flexible extender 130 are made as desired in relation to reading times or anticipated reading periods. Lastly, during reading, the user can slide a page out from under one flexible extender 130 and slide it under the opposite flexible extender 130. Optionally, a string or wire 132 can be extended from the upper edge 104 of the panel 101 across the center line of the book and locked at the lower edge 106. Conversely, the string 132 may be extended from the lower edge 106, across the center line of the book and locked at the upper edge 104. The center string 132 is especially useful when the user reads the book on the supporting surface in a lying-down and facing-up position.

The first arm member 21 and second arm member 20, as well as other structures that the second arm member may be connected to (as set forth in FIGS. 2-5), such as a desk, a cart or a vertical member are the same as previously described for the laptop support embodiment of the invention may be incorporated in the embodiment of the invention shown in FIG. 6.

From the various embodiments described and shown herein, it will be obvious that many modifications and variations of the present invention are possible in light of the above teachings. It is, therefore, to be understood that the invention may be practiced otherwise than as specifically described in the various embodiments in this specification and that the scope of the invention is to be defined by the appended claims.

What is claimed is:

1. A multipurpose support device comprising:
a base; and a first support member that is immovably coupled to an edge of the base, wherein the plane of the first support member is substantially perpendicular to the base, and wherein the base is connected to a first arm member and the first arm member is movably connected to a second arm member, said second arm member providing a means for holding the multipurpose support device in a specified position, and further comprising a second support member that is connected to the first support member, wherein the second support member is movable relative to the base and the first support member, and wherein the second support member comprises a plurality of wrist supports, and wherein the second support member comprises recessed spaces, the recessed spaces comprising an interior cross-section larger than the wrist supports inside which the wrist supports are placed when not in use.

2. The multipurpose support device according to claim 1, wherein the base is pivotable relative to the second arm member.

3. The multipurpose support device according to claim 1, wherein the base is movably connected to a vertical member.

4. The multipurpose support device according to claim 3, wherein the vertical member is straight.

5. The multipurpose support device according to claim 1, wherein the base is horizontally translatable toward and away from a user.

6. The multipurpose support device according to claim 1, wherein the base is tiltably adjustable relative to a user.

7. The multipurpose support device according to claim 1, wherein the base is vertically adjustable.

* * * * *